T. B. FUNK.
AIR CLEANING MECHANISM.
APPLICATION FILED JUNE 5, 1917.

1,319,059.

Patented Oct. 21, 1919.

Witness:
Harry S. Gaither

Inventor
Truman B. Funk
by Banning & Banning
Attys

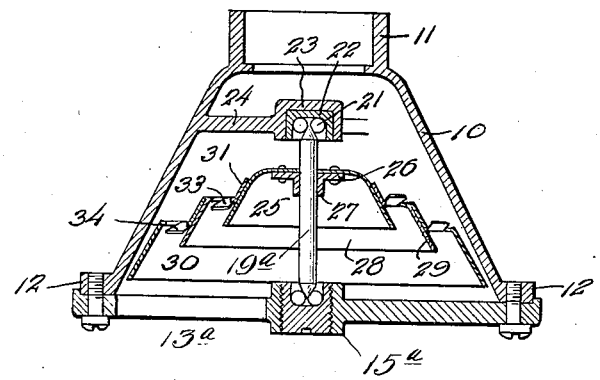
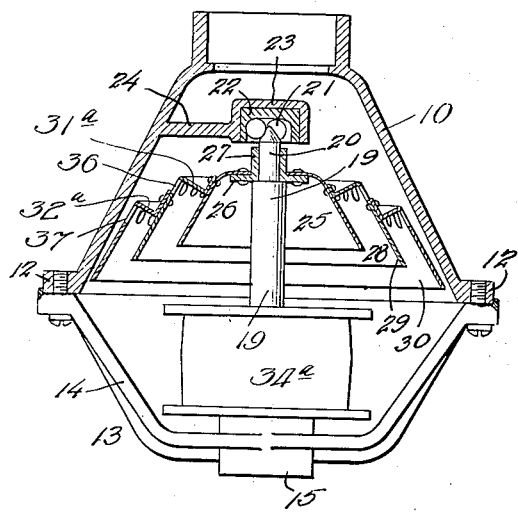
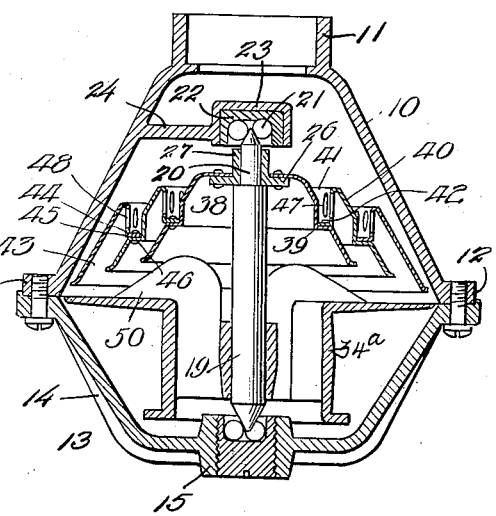

T. B. FUNK.
AIR CLEANING MECHANISM.
APPLICATION FILED JUNE 5, 1917.
1,319,059.
Patented Oct. 21, 1919.
3 SHEETS—SHEET 3.
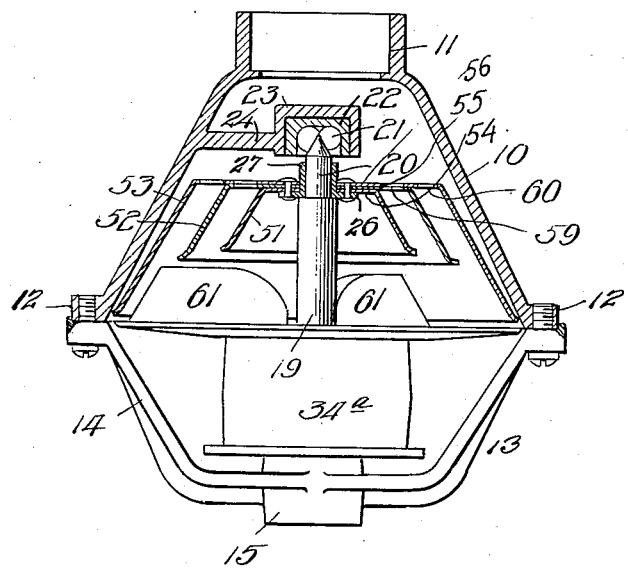
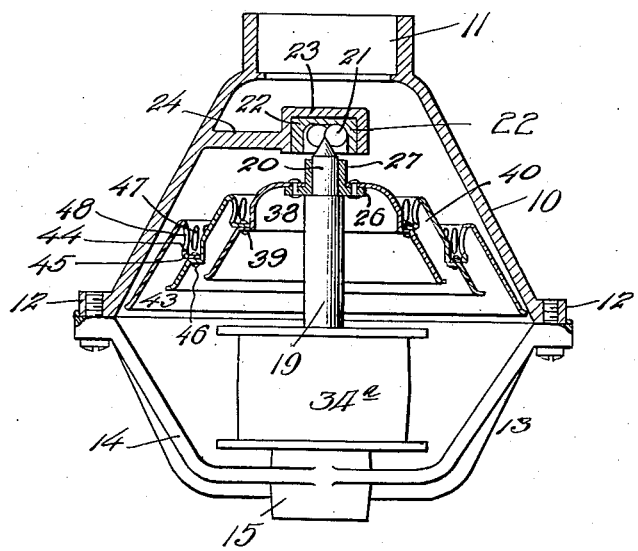
Witness:
Harry S. Gaither
Inventor:
Truman B. Funk
by Banning & Banning
Attys

UNITED STATES PATENT OFFICE.

TRUMAN B. FUNK, OF MOLINE, ILLINOIS, ASSIGNOR TO MOLINE PLOW COMPANY, OF MOLINE, ILLINOIS, A CORPORATION OF ILLINOIS.

AIR-CLEANING MECHANISM.

1,319,059. Specification of Letters Patent. Patented Oct. 21, 1919.

Application filed June 5, 1917. Serial No. 173,015.

*To all whom it may concern:*

Be it known that I, TRUMAN B. FUNK, a citizen of the United States, residing at Moline, county of Rock Island, and State of Illinois, have invented certain new and useful Improvements in Air-Cleaning Mechanism, of which the following is a specification.

The air cleaner of the present invention is designed primarily for use in the removal of dust or like impurities from the air admitted to the carbureter of a hydro-carbon engine, although the device is capable of other use in connection with other devices or apparatuses for securing a similar result. The air admitted to the carbureter is sucked or drawn in by the pulsations of the engine, and this suction, which occasions the inflow of the air, is relied upon, either in whole or in part, to operate the working mechanism of the present device, although the latter may be power-driven and designed to embody a fan for assisting the suction of the carbureter, if desired.

The invention consists further in the features of construction and combinations of parts hereinafter described and claimed.

In the drawings:

Fig. 4 is a sectional elevation of a modification of the device in Fig. 1, in which the driving pulley is omitted and the suction alone relied on;

Fig. 5 is a sectional elevation of a slightly modified form of the invention;

Fig. 6 is a sectional elevation showing a still further modified form of the invention, embodying a fan;

Fig. 7 is a similar view of the device of Fig. 6, with the fan omitted; and

Fig. 8 is a similar view of still another modification.

Figure 1:
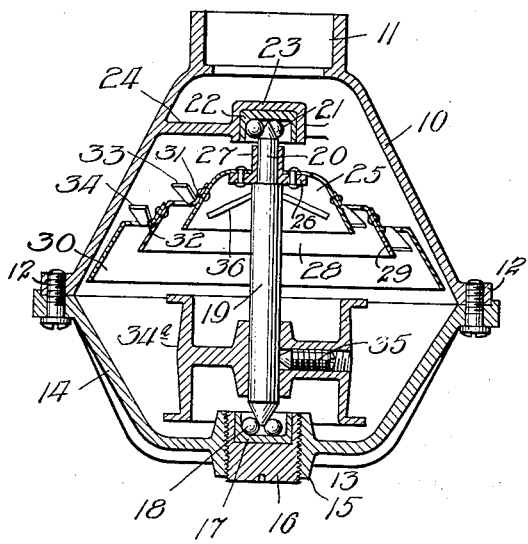
Figure 1 is a sectional elevation through the device of the present invention.
Figure 2:
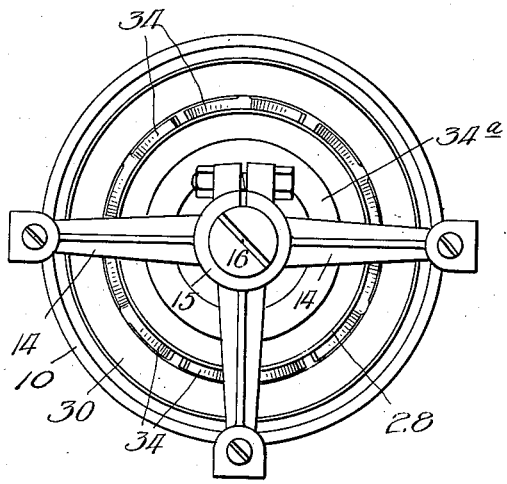
Fig. 2 is a bottom plan view of the same.
Figure 3:
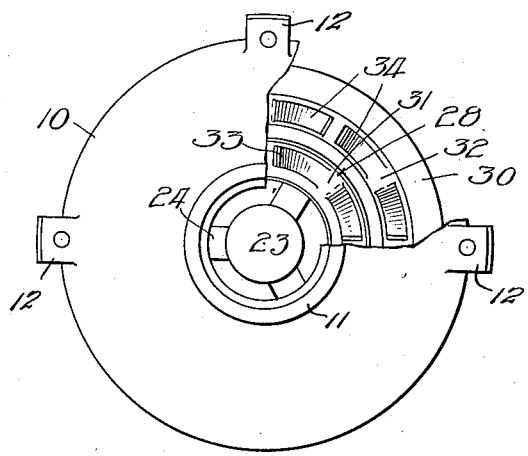
Fig. 3 is a top plan view of the same.

In each of the modifications shown, a housing is employed, which comprises a bell-shaped casing 10 provided with an open neck 11, which latter is connected with the intake of a carbureter, or the like. The bell-shaped cap is provided at suitable intervals with outstanding lugs 12 which furnish points of attachment for a spider frame 13 having downwardly converging arms 14 which unite in a threaded head 15, which latter receives a threaded adjustable plug 16. The latter is recessed to receive a hardened bearing cup 17 which furnishes a runway for a plurality of balls 18 which support the beveled lower end of a pintle 19, the upper end 20 of which is reduced in diameter and beveled to bear against a plurality of upper balls 21 housed in an upper bearing cup 22, which is socketed in the head 23 of a spider 24 located near the upper end of the bell-shaped cap, and suitably connected to or integrally formed with the walls thereof.

The pintle and bearing therefor, as above described, are common to all of the modifications heretofore described, with the exception of the modification shown in Fig. 4, which will be presently referred to. The pintle 19 serves as a mounting for a rotating baffle device, the form of which may be modified in certain particulars without departing from the spirit of the present invention. The baffle device of Fig. 1 comprises an inner inverted cup 25 which is perforated in its center and is secured to the annular flange 26 of a collar 27 which embraces the reduced upper end 20 of the pintle. The inner cup 25 has attached thereto an intermediate frustum shaped annular baffle 28, having downwardly diverging walls 29 which terminate in a rim which extends below the rim of the inner baffle cup.

The intermediate baffle 28 has secured to its outer wall an outer baffle 30 likewise of frustum shape and extending below the rim of the intermediate baffle, the arrangement being that of a series of cone-shaped members concentrically nested one within the other, and held in spaced relation. The spacing of the intermediate and outer baffles is provided for by the provision of inturned upper flanges 31 and 32 on the intermediate and outer baffles, respectively, which flanges are connected, respectively, to the adjacent walls of the inner cup and the intermediate baffle.

In the device of Fig. 1, in order to positively increase the suction through the device, the inturned top flanges of the intermediate and outer baffles, respectively, are provided with a series of tongues 33 and 34 which are alternately struck up and down and extend in annular relation around the respective connecting top flanges, and extend in diagonal relation with respect to the plane of rotation of the device, which tongues form, in effect, the diagonal blades of a fan, with the result that, as the pintle is rotated, a suction will be induced through the apparatus into the carbureter to supplement the normal suction occasioned by the pulsations of the engine.

The pintle is rotated by means of a pulley 34ª mounted upon the pintle 19, below the baffles and held in place by means of a set-screw 35. This pulley is adapted to afford belt connection with any suitable source of power, which permits the apparatus to be driven at the desired speed. In order to assist in breaking up the converging currents of air, which enter the inner cup-shaped baffle, a plurality of radially arranged blades or fins 36 are secured to the pintle at a point within the inner baffle, which assist in directing the air currents outwardly against the flaring walls of the inner baffle.

The device of Fig. 4 is similar in all respects to the device heretofore described, with the exception that the pulley for positive driving is omitted and the suction of the carbureter alone relied upon to rotate the baffles. In this construction the pintle 19ª is shortened and mounted at its lower end in a bearing which is supported within the head 15ª of a flat spider 13ª, the arrangement being shortened and more compact than that heretofore described.

The modification shown in Fig. 5 is similar in all respects to that shown in Fig. 1, with the exception that the connecting annular flange walls 31ª and 32ª are slightly depressed and imperforate, no diagonally disposed tongues being provided. In place of the tongues, the intermediate and outer conical baffles are provided with perforations 36 and 37 in the outer flaring walls, which are arranged in series near the point of juncture between the outer flaring walls and the upper flange walls.

In Fig. 6 the flaring wall of the cup-shaped inner baffle is provided with an annular shoulder 39 which affords a point of connection for the intermediae baffle 40, the flaring wall of which, at its upper rim, is reversely turned to afford a vertical throat wall 41, the lower edge of which is inturned to provide an annular flange 42 which is secured to the shoulder 39 on the wall of the inner baffle. The outer baffle 43 is similarly formed to provide a vertical throat wall 44 terminating in an annular flange 45 which is fitted to and connected with an annular shoulder 46, formed in the flaring wall of the intermediate baffle. The throat walls of the intermediate and outer baffles are each provided with a series of perforations 47 and 48, which permit of the inflow of air into the chamber above the baffles. The pintle, furthermore, has mounted thereon a pulley 34ª which carries a fan 50 located below the baffles, which arrangement affords means for positively inducing a current of air through the device to supplement the suction of the carbureter.

The device of Fig. 7 is identical with that heretofore described, with the exception that the fan 50 is omitted, although the pulley is retained in order to positively rotate the baffle device.

In the construction of Fig 8, inner intermediate and outer conical baffles 51, 52, and 53 are employed, provided with inturned upper flanges 54, 55, and 56, which latter, in the construction of Fig. 8, are progressively wider in the respective baffles, so that they will fit together and overlap one another, as shown, all of them abutting with a collar 27 provided with an annular flange 26, to which all three of the inturned flange walls are connected. The flange walls are provided with a series of perforations 59 and 60 for permitting the passage of air through the baffles and into the upper part of the bell-shaped casing. The device of Fig. 8 employs a fan 61 similar to the fan 50, and the mountings and other features are practically identical with those heretofore described.

The separation of the dust particles from the air is effected in the main by the action of the centrifugal force occasioned by the rotating of the baffles. This rotating action, supplemented by the suction, causes the inflowing air to be whirled against the respective conical baffles, and its progress momentarily arrested, with the result that the suspended particles of dust or the like will be thrown back and removed from the air prior to its entrance in the carbureter. The rotation of the air currents will be occasioned by frictional contact with the respective conical baffles, and the impingement of the air against the baffles may be assisted, if desired, by the employment of the blades or fins 36 shown in Fig. 1, although the provision of such devices is not deemed essential in all cases.

The centrally moving stream of air will impinge against the rotating inner baffle and be deflected downwardly and outwardly under the rim of the inner baffle and into the space circumscribed by the intermediate and outer baffles, the respective rims being in stepped arrangement to better induce the deposition of dust particles which are progressively whirled toward the outer rim of the baffle device, and ultimately discharged from the casing. It will be noted that, in each of the modifications shown, the outer baffle lies closely adjacent to the wall of the bell-shaped casing, so that little or no air will be directly admitted past the baffle device without contact with the inner faces of the respective conical baffles. This is due to the fact that the air currents centrally entering the device and passing up in a vertical direction will be outwardly directed by impact upon the baffle plates.

The centrifugal motion occasioned by the rotating baffle plates causes these air currents to travel in a downward direction, until they finally impinge upon the lower inner rim of the housing. The speed of these air currents is greatly increased due to the large diameter of the housing at this point. Therefore, these currents will have a certain velocity and will cause a "ramming effect" which prevents air being drawn between the housing and the rim of the outer baffle. The effect of this is what might probably be termed an air seal at this point, which prevents the motor from drawing in air through this space, because the vacuum above the baffle plates will not be sufficient to overcome the velocity of the air currents passing from the rim of the outer baffle, so that no air or dirt will enter between the baffle and the housing. This causes the dirt particles to be expelled from the housing, and at the same time affords means for the ingress of air through the air ports provided therefor, the dirt meanwhile being driven past these ports by the centrifugal action occasioned by the rotating baffles.

In the device of Fig. 1, the baffles themselves constitute, in effect, a fan which serves to induce the upflow of the air, but, if desired, the fan may be separately formed, as shown in Figs. 6 and 8, without substantial change in the principle of operation. Furthermore, the fan may be entirely dispensed with, as shown in Fig. 5, and the normal suction of the carbureter relied on to induce the flow of the air. In all of the modifications shown, with the exception of that shown in Fig. 4, the device is power-driven, but, if desired, the suction of the carbureter may be relied upon to rotate the baffle device, where the latter is given a fan formation.

In the modifications shown in Figs. 6 and 7, the air currents are given a slightly more circuitous path of travel by forming the air ports or ducts in the inner neck walls of the intermediate and outer baffles, which arrangement may be found of advantage in some circumstances.

Although the device is intended primarily for use in connection with a carbureter, it is obvious that it may be used in other connections. Furthermore, various modifications, other than those specifically described, may be made without departing from the spirit of the invention.

I claim:

1. In an air cleaning device, the combination of a casing, a rotatably mounted cup-shaped inner baffle within the casing, and a surrounding baffle mounted concentrically upon the inner baffle and having its lower rim projected below the rim of the inner baffle, substantially as described.

2. In an air cleaning device, the combination of a casing, a rotatably mounted cup-shaped inner baffle within the casing, and a surrounding baffle mounted concentrically upon the inner baffle and having its lower rim projected below the rim of the inner baffle, the surrounding baffle being provided with air ports and blades set in oblique relation thereto to constitute a fan formation, substantially as described.

3. In an air cleaning device, the combination of a casing, a rotatably mounted cup-shaped inner baffle within the casing, a surrounding baffle concentrically mounted upon the inner baffle and rotatable therewith and having its lower rim projected below the rim of the inner baffle, the surrounding baffle being provided with air ports and blades set in oblique relation thereto to constitute a fan formation, and means for positively rotating the baffles, substantially as described.

4. In an air cleaning device, the combination of a bell-shaped casing, a pintle mounted within the casing, a cup-shaped baffle concentrically mounted upon the pintle, and a concentrically mounted surrounding baffle of flaring formation carried by the cup-shaped baffle and having its lower rim projected below the rim of the centrally disposed cup-shaped baffle, substantially as described.

5. In an air cleaning device, the combination of a bell-shaped casing, a pintle mounted within the casing, a cup-shaped baffle concentrically mounted upon the pintle, and a baffle concentrically mounted on the cup-shaped baffle and of flaring formation having its lower rim projecting below the rim of the centrally disposed cup-shaped baffle, the surrounding baffle being provided with air ports and having wings set in oblique relation thereto to constitute a fan, substantially as described.

6. In an air cleaning device, the combination of a casing provided with a neck adapted for attachment to suitable suction mechanism, a pintle rotatably mounted within the casing, an inverted cup-shaped inner baffle carried by the pintle, an intermediate flaring baffle carried by the cup-shaped inner baffle, an outer flaring baffle carried by the intermediate baffle, the rims of the respective baffles being in stepped relation to one another, and air ports in the upper portion of the intermediate and outer baffles, substantially as described.

7. In an air cleaning device, the combination of a bell-shaped casing, a pintle rotatably mounted in the bell-shaped casing, an inverted cup-shaped inner baffle concentrically mounted on the pintle, a flaring intermediate baffle carried by the cup-shaped baffle, a flaring outer baffle carried by the intermediate baffle, the lower edges of the respective baffles being in stepped relation, the intermediate and outer baffles being provided with air ports, and obliquely arranged blades adjacent the air ports and constituting fan blades, substantially as described.

TRUMAN B. FUNK.